Patented May 30, 1933

1,911,746

UNITED STATES PATENT OFFICE

STEPHEN P. BURKE, OF PLAINFIELD, NEW JERSEY, AND CHARLES F. FRYLING, OF METUCHEN, NEW JERSEY, ASSIGNORS TO DOHERTY RESEARCH COMPANY, OF NEW YORK, N. Y., A CORPORATION OF DELAWARE

SELECTIVE OXIDATION OF HYDROCARBONS

No Drawing.   Application filed June 3, 1929.   Serial No. 368,184.

This invention relates to processes for the production of valuable partial oxidation products from hydrocarbons. More particularly it concerns the preparation of such products by an oxidation treatment of gaseous mixtures containing hydrocarbons together with other combustible gases such as hydrogen and carbon monoxide under such controlled conditions that the hydrocarbon components of the said mixture are selectively oxidized. The other oxidizable gases are not materially effected by the action of the oxidizing agent employed.

This subject-matter is related to that contained in our co-pending United States application Ser. No. 334,589 filed Jan. 23, 1929, of which this application is a continuation in part.

The primary object of the present invention is to provide a process for effecting the partial oxidation of hydrocarbons with oxygen or air in the presence of substantial proportions of such combustible gases as hydrogen or carbon monoxide whereby the hydrocarbon components of the gas mixture are selectively oxidized to give satisfactory yields of valuable partial oxidation products.

Another object of the invention is to provide a process for selectively effecting the partial oxidation of hydrocarbons in the presence of other combustible gases whereby the major part of the oxidizing agent is utilized in forming partial (as distinguished from complete) oxidation products.

Still another object of the invention is to provide in an improved manner for reforming a relatively high B. t. u. gaseous mixture containing hydrocarbons and other oxidizable components to yield a gas mixture having a heating value suitable for domestic use, or other special uses.

At the present time there are produced in various industrial operations a variety of gas mixtures containing hydrocarbons in the presence of other combustible gases such as hydrogen or carbon monoxide. Notable examples of such gas mixtures are coal gas, carburetted water gas, and cracking still gases.

Heretofore attempts have been made to oxidize such combustible gas mixtures containing hydrocarbons and hydrogen and carbon monoxide with oxygen, the latter being employed in amounts insufficient to render the mixture explosive. Under the conditions at which the reactions were carried out, the hydrogen was first attacked, and thereafter the hydrocarbon and carbon monoxide were affected. A familiar illustration of such a process is the well known method of gas analysis in which mixtures of hydrocarbons and hydrogen are passed over CuO whereby the $H_2$ is selectively oxidized quantitatively. This resulted in the loss of a valuable combustible constituent,—hydrogen—and rendered such processes inefficient at least from the standpoint of oxygen consumption, since the latter was largely used up in forming complete oxidation products, such as water.

The present invention is based upon the discovery that by carrying out the partial oxidation of a gas mixture containing hydrocarbons and other oxidizable gases under certain controllable conditions hereinafter disclosed, it is possible to selectively oxidize the hydrocarbon component of the said mixture so as to yield valuable oxygen-bearing organic compounds without materially effecting the combustion of the other oxidizable gases therein.

The process preferably contemplates carrying out the partial oxidation reactions in the absence of solid contact catalysts such as are known to activate the hetrogeneous (surface) type of reactions; and the said process is preferably performed in a reaction vessel, the walls and other parts in contact with the gas mixture of which are preferably made of a substance which is catalytically inert and which has apparently no surface catalytic action upon oxidation and dehydrogenation reactions. The process as carried out embodies the principles of homogeneous (gas- or-vapor-phase) oxidation. In utilizing the said principles in connection with the present invention, it is essential to employ pressure substantially above atmospheric. By so doing, the reaction velocity of the hydrocarbon oxidation may be selectively increased over that of the other oxidizable gases, and as a result a reaction temperature can be adopted at which the hydrocarbons react rapidly to form partial oxidation products, the other oxidizable gases reacting almost negligibly.

In connection with oxidation reactions occurring between mixtures of hydrocarbons and air or oxygen-containing gases in accordance with the present invention, it has been conclusively shown that the temperature required to induce complete reaction, is a well-defined one at any selected pressure. That is to say, the partial oxidation reaction will go to completion within the scope of a very narrow temperature range for any selected pressure. This is also true for reactions occurring, in accordance with the present disclosure, between mixtures of hydrogen or carbon monoxide or both and air or other oxygen-containing gas. In the course of the reaction between hydrogen and air, water alone is formed as the final product. However, in the case of the reactions occurring between hydrocarbons and air or the like in the course of which partial oxidation products are formed, the temperature required for completion of the reaction is very substantially lowered as the pressure under which the reaction is conducted is increased. The temperature required to induce complete reaction between hydrogen and air or the like is not affected to the same extent by substantial changes in the pressure existing within the reaction chamber. Carbon monoxide-mixtures act similarly to hydrogen-air mixtures in this respect. Consequently by suitably adjusting the pressure under which a mixture containing for example, hydrocarbons, hydrogen, carbon monoxide, and air or oxygen is reacted, it is possible to selectively oxidize the hydrocarbon component of the mixture to form the desired partial oxidation products at a temperature below that at which the hydrogen and/or carbon monoxide will react appreciably with the air or oxygen present in the said mixture. The presence of the usual oxidation catalysts such as platinum, copper and the like is to be avoided, since these apparently tend to increase the velocity of the oxidation of the non-hydrocarbon combustible gases to yield complete oxidation products.

For instance, mixtures of hydrogen and a hydrocarbon such as propane, when reacted at temperatures of approximately 350° C., (and which necessitates pressures in the vicinity of 300 to 400 lbs. per square inch) with oxygen, or with air or other oxygen-containing gas, in which sufficient of the latter was employed to give an initial mixture having an oxygen concentration of around 6%,—gave yields of organic products only slightly less in quantity than the yields obtained under similar conditions from pure propane. This was found to be the case even though the initial gas mixture contained approximately equal amounts of propane and hydrogen, the hydrogen being but slightly affected in the process.

The following example is intended for illustrative purposes only, and is not to be construed in any manner as a limitation of the invention, the scope of which is clearly indicated in the appended claims.

A mixture of propane and air in about the proportion of 67% propane, and 33% air was passed under a pressure of 450# per square inch through an aluminum-lined reaction chamber having an inside diameter of .82 in. and held at a temperature of 340°–360° C., the rate of gas flow therethrough being substantially 18 cu. ft. per hour and the time of passage through the reaction zone being 12.5 seconds. The reaction products were cooled as rapidly as possible after leaving the reaction chamber, and the condensible oxidation products were condensed to yield a so-called liquid drip containing methanol and formaldehyde in substantial amounts together with water and other reaction products, among which are small amounts of such oxygenated substances as organic peroxides and materials derived therefrom, aldehydes, ketones, acetals and organic acids. The major portion of this liquid drip was made up of organic materials including alcohols, aldehydes, and organic acids.

In an experimental run made under substantially equivalent conditions upon a mixture containing 43% propane, 30% hydrogen and 27% air, a smaller volume of organic drip was obtained, which had a slightly higher water content and a somewhat lower content of organic material than the drip obtained in the propane-air run. The water content in the propane-hydrogen-air run was only about two-thirds of that which would have been produced if the propane and hydrogen in the mixture had been uniformly reacted upon by the air.

Apparently the rate of oxidation of the hydrocarbons is not affected by the intermediate oxidation products present in spite of the evident diluting effect of the latter.

Similar experiments on samples of manufactured gas containing hydrocarbons, hydrogen, carbon monoxide and other oxidizable gases show corresponding results.

A sample of manufactured gas containing 8.3% illuminants, 30.4% of carbon monoxide, 13.4% $CH_4$ and 32.7% of $H_2$, was mixed with sufficient air to yield a gas mixture having the following initial composition. This gas mixture was then passed under a pressure of 450# per square inch through a reaction chamber similar to that employed in the previous example heated to a temperature of approximately 405° C., at a rate of flow of 21.4 cu. ft. per hour. The reaction products were immediately cooled as formed and the condensible portions were condensed to form a liquid drip which contained substantial amounts of formaldehyde and methanol, and which had an acidity of .08N.

Analyses of both the initial gas mixture before the oxidation treatment and of the gas residue after the said treatment indicate that a large proportion of the higher hydrocarbons such as ethane and ethylene had been oxidized to yield partial and complete oxidation products, while relatively small amounts of carbon monoxide, and hydrogen were oxidized. The said treatment did not oxidize substantial amounts of the methane component of the gas mixture.

The following data indicates the percentage composition of the city gas-air mixture as it existed under the pressure indicated above prior to the reaction, and also the percentage composition of the final gaseous reaction products.

|  | $CO_2$ | CO | Illuminants | $O_2$ |
|---|---|---|---|---|
| Initial | 3.2 | 20.9 | 6.0 | 6.7 |
| Final | 5.7 | 25.2 | 1.4 | 0.5 |

The value given for illuminants indicates the relative amounts of the hydrocarbons of higher molecular weight than methane that was present in the gas.

The partial oxidation reactions which result in the formation of liquid partial oxidation products in accordance with the present invention are believed to be principally homogeneous in their nature.

The expression "homogeneous partial oxidation reaction" is employed in the specification and claims to define generically a type of reaction that occurs with substantially equal velocity throughout all sections of the reaction zone in the absence of contact catalysts. Such a reaction is distinguished from the heterogeneous type of reaction in that the reaction velocity of the latter is accelerated in those parts of the gaseous reaction mixture having contact with the solid activating surfaces of the catalyst, usually being retarded in the parts of the mixture remote from such surfaces. However, the present invention is not to be regarded as limited to any particular theory as to the homogeneous character of the reaction or otherwise.

The employment of gaseous or vapor phase catalysts such as nitric oxide, methyl ether and the like, as well as the principles of auto-catalysis, are within the scope of the invention.

It is essential in carrying out these partial oxidation reactions to avoid the presence in the reaction chamber of such oxidation catalyst as platinum, copper and vanadium oxide which apparently selectively increase the velocity of the oxidation of the non-hydrocarbon combustible gases to form complete oxidation products.

On the contrary, the reaction velocity of oxidation of the hydrocarbon components of a gas mixture containing also other combustible gases may be selectively increased over that of the other gases by the use of pressure within the reaction zone. This permits the adoption of a reaction temperature at which the hydrocarbons react rapidly and at which the other oxidizable gases react almost negligibly.

In carrying out the various steps of the process, apparatus of the general type and character disclosed in our co-pending patent application Ser. No. 334,589 filed Jan. 23, 1929, may be employed, although the principles of the present invention obviously may be embodied in other types of apparatus besides that shown in the aforesaid application.

The combustible gas mixture and the air, or either of them, may be separately preheated under atmospheric or superatmospheric pressure, preferably to within approximately 100° C. of the desired reaction temperature, prior to their intermixture. In any event the mixture is subjected to superatmospheric pressures during its passage through the reaction chamber.

The process is applicable not only to combustible gas mixtures containing the lower hydrocarbons, but includes mixtures containing also the higher hydrocarbons, many of which are liquids at atmospheric temperature and pressure. The higher paraffin hydrocarbons are comparatively more responsive to the action of the oxygen-containing gas than are the lower paraffin hydrocarbons, so that the degree of selectivity with which the hydrocarbon component of gas mixtures containing them together with hydrogen and carbon monoxide is oxidized is substantially greater than in the case mixtures containing only the lower members of the paraffin series.

The process may also be applied to the treatment of gas mixtures containing unsaturated hydrocarbons such as ethylene and other olefins together with other oxidizable gases such as hydrogen. It will be understood, of course, that the invention is not limited to the production of any specific hydrocarbon-oxygen compound, nor to the partial oxidation treatment of any specific type of gas mixture containing hydrocarbons and other oxidizable gases. Natural gas and manufactured gases such as coal gas, cracking still gas, and the like may be satisfactorily treated according to the present invention.

It is highly desirable that the temperature of the oxidation reaction be controlled. Because of the homogeneous nature of these partial oxidation reactions, satisfactory temperature control may be best facilitated either by the use of large-sized reaction tubes filled with granulated, catalytically-inert material, or by the use of open-ended tubes of small (almost capillary) size, preferably constructed from good heat-conductant material such as aluminum and surrounded by a liquid bath such as mercury, lead or diphenyl oxide maintained within a desired, narrow temperature range.

The construction of the reaction chambers from material having a high heat conductivity makes possible the ready dissipation of any excess heat formed during the reaction as rapidly as it is produced. As distinguished from most metals, aluminum is not a catalyst for the complete combustion of hydrocarbons, and consequently the use of aluminum favors a high yield of aldehydes obtained by the partial oxidation of hydrocarbons, by preventing or substantially reducing the loss of hydrocarbons by heterogeneous reactions forming complete oxidation products. Stainless steel, and pyrex glass have been satisfactorily substituted for aluminum in constructing the reaction tubes or internal linings therefor.

The reaction mixture after leaving the reaction zone may be given additional stages of treatment with oxygen-containing fluids, with or without the use of contact catalysts. Furthermore when the said reaction mixture contains acids, aldehydes, alcohols and hydrogen, the mixture may be passed over a suitable hydrogenating catalyst such as nickel under conditions which facilitate the hydrogenation of these substances to alcohol.

The organic content of the liquid oxidation products decreases rapidly as the amount of oxygen in the initial reaction mixture is increased much above 10% of the latter by volume.

The minimum temperature below which no selective partial oxidation of the hydrocarbon components of the gas mixtures occurs is in general considerably higher than the temperature at which complete combustion reactions are ordinarily activated in the presence of heterogeneous catalysts such as platinum and copper. Preferably the reaction chamber is maintained at a temperature not substantially exceeding the minimum temperature required to initiate the reaction between the oxygen and the hydrocarbon components of the gas mixture which,—under the conditions of pressure, oxygen concentration, and the like, maintained in the reaction chamber,—react more readily with the oxygen present to yield partial oxidation products than do the hydrogen and carbon monoxide components.

It is possible by carrying out the various steps of the invention in accordance with the above disclosure to reform industrial gas mixtures,—such as a relatively high B. t. u. manufactured gas or a rich natural gas, which contain hydrocarbons and other oxidizable components,—in a manner to selectively oxidize the hydrocarbon constituents of the gas or portions thereof to form valuable liquid partial oxidation products and to yield a residual gas mixture having a heating value within a range adapting it for domestic use.

The invention is susceptible of modification within the scope of the appended claims:

We claim:

1. The process of selectively converting into liquid partial oxidation products the hydrocarbon components of a gas mixture containing hydrocarbons together with hydrogen, which comprises passing such a gas mixture and an oxygen-supplying gas in a stream of approximately capillary size under a superatmospheric pressure above 300 pounds per sq. in. while out of contact with any material adapted to catalyze the complete combustion of the hydrocarbons or the combustion of hydrogen, reaction zone maintained at a temperature not substantially exceeding the minimum required to initiate the reaction between the oxygen and the hydrocarbon components of the mixture, thereby causing homogeneous partial oxidation reactions to occur, and dissipating any excess heat formed in the reaction zone substantially as rapidly as it is formed.

2. The process of reforming a gaseous mixture containing hydrocarbons and hydrogen to reduce the heating value thereof and concurrently to produce liquid partial oxidation products therefrom, which comprises treating such gas mixture with less than 10% by volume of oxygen, in the absence of materials acting as dehydrogenating and oxidizing catalysts and under superatmospheric pressure thereby effecting the homogeneous partial oxidation reaction between the hydrocarbons and oxygen to form liquid partial oxidation products at an elevated temperature below that at which the hydrogen will substantially react with the oxygen, cooling and condensing the said partial oxidation products as formed, and separately recovering the non-condensible gases from the said reaction.

3. The process of reforming a gaseous mixture containing hydrocarbons and hydrogen to reduce the heating value thereof and concurrently to selectively convert into liquid partial oxidation products the hydrocarbon components thereof, which comprises reacting such mixture in the gaseous phase and in the absence of solid contact catalysts with less than 10% by volume of oxygen in the form of an oxygen-supplying gas under high superatmospheric pressure above 300 pounds per square inch and at a temperature just sufficiently high selectively to cause partial oxidation reaction to occur between the hydrocarbon components and the oxygen of the mixture, but substantially below that at which substantial reaction between the oxygen-supplying gas and hydrogen occurs.

4. The process of selectively converting into liquid partial oxidation products the hydrocarbon components of a gaseous mixture containing paraffin hydrocarbons, carbon monoxide and hydrogen, while preventing substantial oxidation of the carbon monoxide and hydrogen, which comprises reacting such a gaseous mixture with less than $\frac{1}{10}$ its volume of oxygen in the form of an oxygen-containing gas in the absence of solid contact catalysts, while the mixture is under high superatmospheric pressure above 300 pounds per square inch and at an elevated temperature below that at which hydrogen and carbon monoxide will react with the oxygen in other than minor amounts, but at which substantial homogeneous partial oxygen reactions occur between the hydrocarbons and the oxygen at the superatmospheric pressure employed.

5. The process of reforming a gaseous mixture containing hydrocarbons and hydrogen to reduce the heating value thereof and concurrently to produce liquid partial oxidation products therefrom, which comprises reacting such gaseous mixture with less than 10% of its volume of oxygen in the absence of solid contact catalysts and under a superatmospheric pressure of several hundred pounds per square inch, at an elevated temperature below that at which the hydrogen will react with the oxygen in other than minor amounts but at which the hydrocarbons readily react with the oxygen at the superatmospheric pressure employed, thereby forming liquid partial oxidation products, rapidly cooling and condensing the latter as formed, and separately recovering the noncondensible gases from the said reaction.

6. The process of selectively converting into liquid partial oxidation products the hydrocarbon components of a gas mixture containing hydrocarbons together with hydrogen, which comprises reacting the said gaseous mixture in the absence of solid contact catalysts with less than 10% of its volume of oxygen in the form of an oxygen-containing gas under several hundred pounds pressure and at a temperature not substantially exceeding the temperature required for initiating a partial oxidation reaction between the hydrocarbon components and oxygen of the said mixture at the superatmospheric pressure employed.

7. The process of selectively converting into liquid partial oxidation products the hydrocarbon components of a gaseous mixture containing hydrocarbons, carbon monoxide and hydrogen, which comprises reacting the said mixture with air in amount sufficient to provide the gas mixture with an oxygen concentration at 6 to 7%, at a controlled uniform temperature of approximately 340° to 360° C., and under a pressure of 450 pounds per square inch, while the gaseous mixture is free from contact with solid catalysts.

8. The process of selectively converting into liquid partial oxidation products, the hydrocarbon components of a gaseous mixture containing hydrocarbons together with hydrogen, which comprises passing such gas mixture containing less than $\frac{1}{10}$ of its volume of oxygen in the form of an oxygen supplying gas through a reaction zone maintained at several hundred pounds per square inch superatmospheric pressure and at a temperature not substantially exceeding the minimum temperature required to initiate a partial oxidation reaction between the oxygen and the hydrocarbon components of the said mixture under the conditions of pressure employed, the said partial oxidation reaction being conducted in the presence of a gaseous catalyst selected from the group consisting of nitric oxide and methyl ether.

In testimony whereof I affix my signature.
STEPHEN P. BURKE.
In testimony whereof I affix my signature.
CHARLES F. FRYLING.